July 21, 1959
J. T. RICHARDSON
2,895,713
CABLE LASHER
Filed Oct. 8, 1956
2 Sheets-Sheet 1
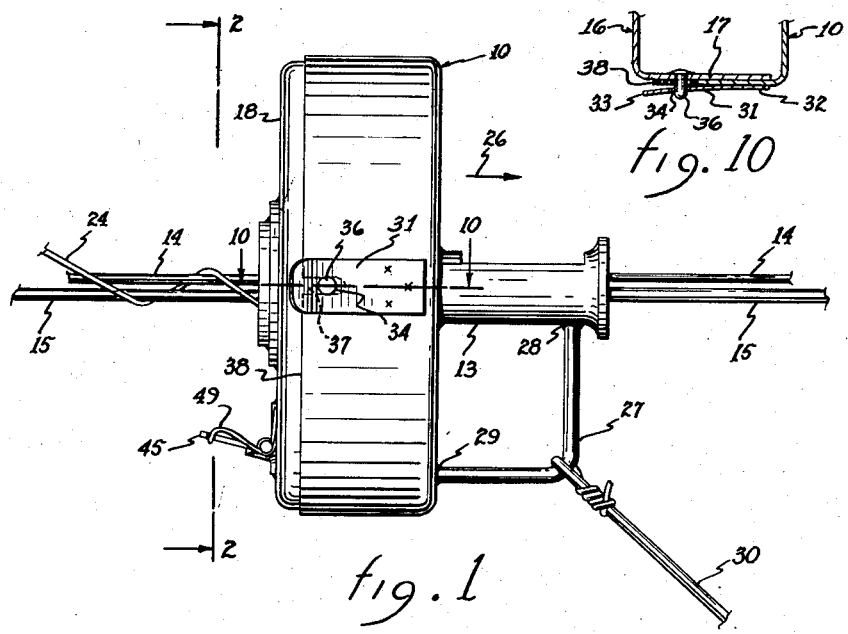
fig. 1
fig. 10
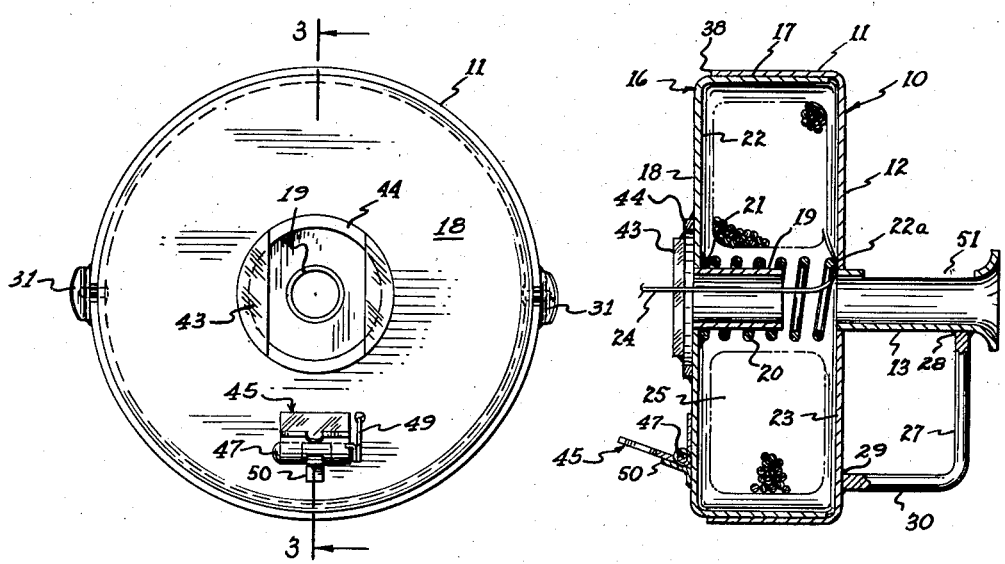
fig. 2
fig. 3
INVENTOR.
JOHN T. RICHARDSON
BY
Willard S. Grant
ATTORNEY July 21, 1959     J. T. RICHARDSON     2,895,713
CABLE LASHER
Filed Oct. 8, 1956     2 Sheets-Sheet 2
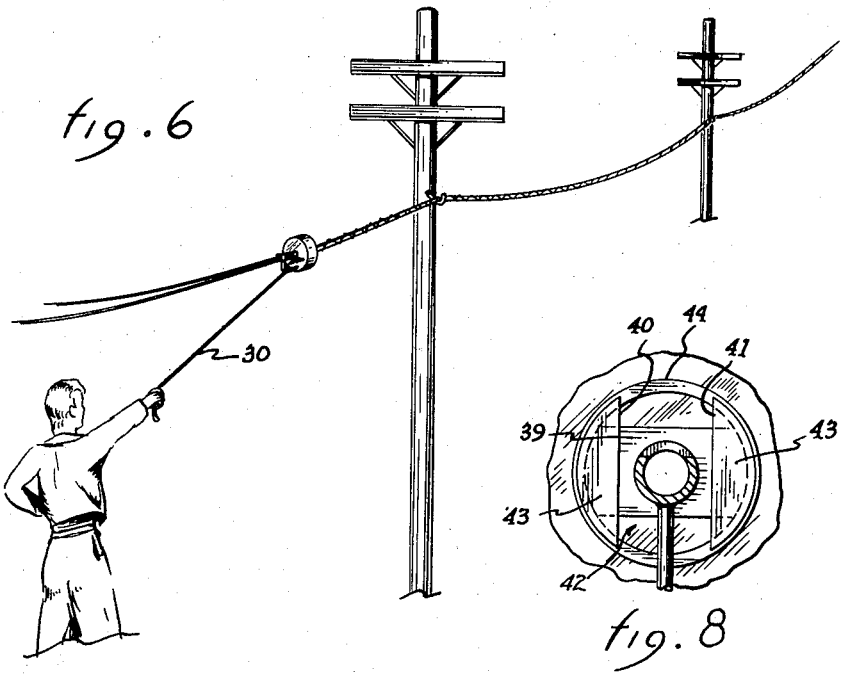
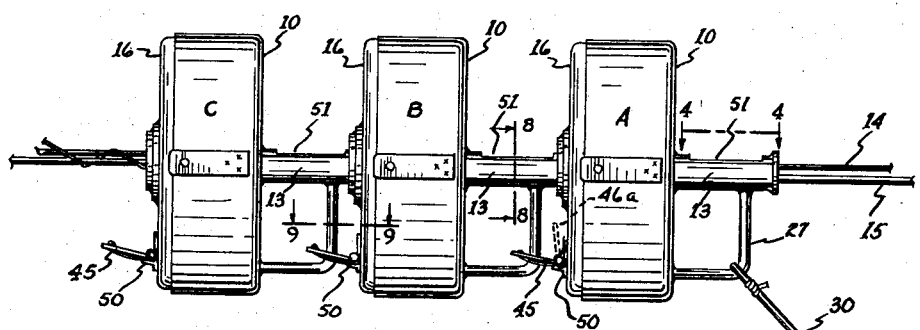
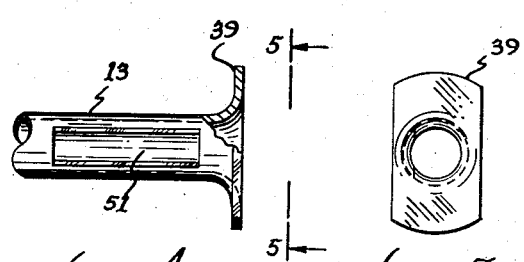
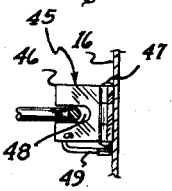
INVENTOR.
JOHN T. RICHARDSON
BY
Willard S. Grover
ATTORNEY United States Patent Office 2,895,713
Patented July 21, 1959

2,895,713

CABLE LASHER

John Thornton Richardson, Phoenix, Ariz., assignor to Antennavision Manufacturing & Engineering Company, Phoenix, Ariz., a corporation of Arizona Application October 8, 1956, Serial No. 614,675

5 Claims. (Cl. 254—134.3)

This invention pertains to improvements in cable lashers and is particularly directed to a cable lasher which is placed on the messenger cable and pulled therealong to wrap a lasher wire around the messenger cable and the associated electrical conductor so that the electrical conductor is supported by the messenger cable.

One of the objects of this invention is to provide a cable lasher which may be traversed along a messenger cable to automatically spirally lash a supporting wire around the messenger cable and the electrical conductor to be supported thereby.

Another object of this invention is to provide a cable lasher that is simple in construtcion and operation and which relies on the traverse movement and the spiral unwind of the supply coil of lashing wire to automatically lash the electrical conductor to the messenger cable.

Still another object of this invention is to provide a cable lasher adapted to hold a coil of lasher wire about a messenger cable and an electrical conductor and to move said coil therealong while allowing said coil to pay out under restricted controlled conditions to provide a tight spiral wrap up of the lasher wire about said messenger cable and electrical conductor.

Further features and advantages of this invention will appear from a detailed description of the drawings in which:

Fig. 1 is a side elevation of a cable lasher incorporating the features of this invention.

Fig. 2 is a trailing end view of the cable lasher shown in Fig. 1 indicated by the line 2—2 of Fig. 1.

Fig. 3 is a section on the line 3—3 of Fig. 2.

Fig. 4 is a fragmentary view of the guide tube partly in section indicated by the line 4—4 of Fig. 7.

Fig. 5 is a lead end view of the guide tube indicated by the line 5—5 in Fig. 4.

Fig. 6 is a view showing the device in operation on a power transmission line.

Fig. 7 is a view showing a series of the cable lashers hooked for tandem operation on a transmission line.

Fig. 8 is a section on the line 8—8 of Fig. 7.

Fig. 9 is an enlarged fragmentary view on the line 9—9 of Fig. 7.

Fig. 10 is an enlarged fragmentary view on the line 10—10 of Fig. 1.

As an example of one embodiment of this invention there is shown a cable lasher having a front cup member 10 having a peripheral portion 11 and the radially disposed disc portion 12 to which is fixed the forwardly extending guide tube 13 which rides along over the messenger cable 14 and the electrical conductor 15. A rear cup member 16 has a peripheral portion 17 telescopically fitting into the inside of the peripheral portion of the front cup 10 and has a radially disposed disc portion 18 having an inwardly projecting tube 19 fixed thereto which rides along over the messenger cable 14 and the electrical conductor 15. Around the tube 19 is mounted a compression spring 20 fixed at its rear end 21 to the inside face 22 of the disc 18. The forward face 22a of the spring 20 yieldingly presses against the inner surface 23 of the disc portion 12 of the cup 10. The supply of lashing wire 24 is presented in the form of a hollow roll 25 placed around the spring 20 in the cups 10 and 16 as best shown in Fig. 3 with the wire 24 preferably unwinding from the outside of the roll and frictionally sliding between the forward face 22a of the spring 20 and the inner face 23 of the cup 10 and then rearwardly out through the tube 19 as it wraps about the messenger cable 14 and electrical conductor 15 as the lasher is moved therealong in the direction indicated by the arrow 26. A pulling handle 27 of L-shaped form is fixed at 28 to the guide tube 13 and fixed at 29 to the disc portion of the front cup 10 and provides means for manually pulling the cable lasher along in the direction indicated by the arrow 26 and for the attachment of a pull rope 30 such as shown in Fig. 6. As the cable lasher is pulled along, with one end of the lasher wire 24 suitably held at a starting point, the frictional sliding action of the lasher wire between the spring 20 and the surface 23 gives the proper tension of draw up of the winding of the wire on the messenger cable 14 and electrical conductor 15 while the round-and-round unwrapping of the wire from the coil 25 results in the proper helical wrapping about the cable and conductor.

The two telescopically fitted cups 10 and 16 may be releasably held together by suitable spring clip fasteners comprising flat springs 31 having their rear ends 32 fixed to the peripheral portion 11 of the cup 10 and having hole perforations in their outer flexible ends 33. Radially outwardly extending pins 30 fixed on the periphery of the portion 17 of the cup 16 are contained in the slots 37 formed in the outer edge 38 and snap into the holes 34 in the spring clips when the two cups are placed together as shown best in Figs. 1 and 10.

In certain instances where extra long spans are to be covered, it may be desirable to use two or more of the cable lashers hooked together in tandem as shown in Fig. 7. In this arrangement interlocking mechanism is provided between each successive unit comprising a radially extending plate having diametrically extending lugs 39 fixed on the forward end of the guide tube 13 which may be inserted between the edges 40 and 41 of a slot 42 formed by the segmental pieces 43 fixed to the ring 44 in turn fixed to the disc portion 18 of the cup 16. After insertion of member 39 one unit A is turned 90 degrees into aligned position with the next B and so on with C and B for any number of units used as shown in Fig. 7. Each unit is held in locked position relative to the other by the lock piece 45 comprising hinged member 46 pivoted on a hinge pin 47 carried on the disc portion 18 and having a slot 48 so that the hinged member may be swung down each side of the pulling handle on the next unit when it has been rotated to lock position, Fig. 9, to thus retain the two units together. Suitable spring means 49 normally yieldingly holds the hinged member 46 in locking position against a suitable stop 50 on the disc 18. Merely folding the hinged member 46 to position 46a up against the disc 18 serves to release the handle 27 so that the connected units may be relatively rotated so that they may be released and separated.

When two or more lashers are connected together, as the first unit A uses up its coil of wire 25, the end of that coil passes into the guide tube 13 of the next unit B where it becomes visible in the inspection and splicing slot 51 formed in the guide tube 13 of this unit B. This end is then suitably spliced to the starting end of the coil 25 in unit B and then the units are continued on again along the line, the splicing as described being repeated as each successive unit is exhausted of its coil of lashing wire.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A cable lasher including a pair of interengaging cup members to hold a coil of lashing wire, a guide tube projecting outwardly from one of said cups adapted to traverse along a messenger cable and electrical conductor to be lashed together, a radially extending plate having diametrically disposed lugs fixed on the outer end of said guide tube, means including a pair of segmental members supported in spaced relation from each other and from the other cup to provide a radially extending slot between said segmental members and cavities between said segmental members and said other cup to receive corresponding lugs of another lasher when relatively rotated therewith for multiple interconnection of said lasher on a transmission line to be lashed, and means to lock adjacent interconnected lashers against relative rotation.

2. A cable lasher including a pair of interengaging cup members to hold a coil of lashing wire, a guide tube projecting outwardly from one of said cups adapted to traverse along a messenger cable and electrical conductor to be lashed together, a radially extending plate having diametrically disposed lugs fixed on the outer end of said guide tube, means including a pair of segmental members supported in spaced relation from each other and from the other cup to provide a radially extending slot between said segmental members and cavities between said segmental members and said other cup to receive corresponding lugs of another lasher when relatively rotated therewith for multiple interconnection of said lasher on a transmission line to be lashed, means to lock adjacent interconnected lashers against relative rotation, and a longitudinally disposed splicing slot in said guide tube located between the cup attached to said guide tube and said diametrically extending plate.

3. A cable lasher including a pair of interengaging cup members to hold a coil of lashing wire, a guide tube projecting outwardly from one of said cups adapted to traverse along a messenger cable and electrical conductor to be lashed together, a radially extending plate having diametrically disposed lugs fixed on the outer end of said guide tube, means including a pair of segmental members supported in spaced relation from each other and from the other cup to provide a radially extending slot between said segmental members and cavities between said segmental members and said other cup to receive corresponding lugs of another lasher when relatively rotated therewith for multiple interconnection of said lasher on a transmission line to be lashed, means to lock adjacent interconnected lashers against relative rotation, a longitudinally disposed splicing slot in said guide tube located between the cup attached to said guide tube and said diametrically extending plate, and a pulling handle forming part of said relative rotation arresting means interconnected to said guide tube and associated cup.

4. A cable lasher including a pair of telescopically interengaged cup members, guide tubes fixed to said members adapted to non-rotatively traverse a messenger cable and electrical conductor to be lashed together, a friction drag compression coil spring having one end fixed to one of said cups around the guide tube thereof and having its other end yieldingly engaging said other cup, said cups forming a receptacle to receive a roll of lashing wire, whereby wire unwinding from a roll in said receptacle passes in sliding frictional contact between the other outer yielding end of said spring means and said other cup during the traverse movement of said lasher.

5. A cable lasher including a pair of telescopically interengaged cup members, guide tubes fixed to said members adapted to non-rotatively traverse a messenger cable and electrical conductor to be lashed together, a friction drag compression coil spring having one end fixed to one of said cups around the guide tube thereof and having its other end yieldingly engaging said other cup, said cups forming a receptacle to receive a roll of lashing wire, whereby wire unwinding from a roll in said receptacle passes in sliding frictional contact between the other outer yielding end of said spring means and said other cup during the traverse movement of said lasher, and a demountable latch means interconnected between said cups when in coil-holding position to secure said cups together during said lashing operation.

References Cited in the file of this patent

UNITED STATES PATENTS

| | | |
|---|---|---|
| 274,562 | Chinnock | Mar. 27, 1883 |
| 1,836,593 | Harvey | Dec. 15, 1931 |
| 2,213,363 | Creswell | Sept. 3, 1940 |